(12) United States Patent
Levitt et al.

(10) Patent No.: US 7,378,451 B2
(45) Date of Patent: May 27, 2008

(54) SURFACTANT COMPOSITION HAVING STABLE HYDROPHILIC CHARACTER

(75) Inventors: Yolla B. Levitt, Mendota Heights, MN (US); Matthew T. Scholz, Woodbury, MN (US)

(73) Assignee: 3M Innovative Properties Co, St. Paul, MN (US)

( * ) Notice: Subject to any disclaimer, the term of this patent is extended or adjusted under 35 U.S.C. 154(b) by 136 days.

(21) Appl. No.: 10/687,340

(22) Filed: Oct. 17, 2003

(65) Prior Publication Data

US 2005/0084681 A1    Apr. 21, 2005

(51) Int. Cl.
    B01F 17/00    (2006.01)
    B01F 17/02    (2006.01)
    B32B 9/04     (2006.01)

(52) U.S. Cl. .................... 516/198; 516/200; 428/411.1

(58) Field of Classification Search ......... 516/198–200
    See application file for complete search history.

(56) References Cited

U.S. PATENT DOCUMENTS

| | | |
|---|---|---|
| 3,562,786 A | 2/1971 | Bailey et al. |
| 3,736,172 A | 5/1973 | Delano et al. ................ 117/95 |
| 4,525,374 A | 6/1985 | Vaillancourt |
| 4,780,411 A | 10/1988 | Piejko et al. |
| 4,784,789 A | 11/1988 | Jeschke et al. ............. 252/174 |
| 4,824,639 A | 4/1989 | Hildenbrand et al. |
| 5,073,407 A | 12/1991 | Frazer |
| 5,180,760 A | 1/1993 | Oshibe et al. |
| 5,273,684 A | 12/1993 | Traber et al. |
| 5,514,120 A | 5/1996 | Johnston et al. |
| 5,723,175 A | 3/1998 | Scholz et al. |
| 5,728,446 A | 3/1998 | Johnston et al. |
| 5,753,373 A | 5/1998 | Scholz et al. |
| 5,873,931 A | 2/1999 | Scholz et al. |
| 5,908,582 A | 6/1999 | Feustel et al. |
| 5,916,635 A | 6/1999 | Ishii et al. |
| 5,997,621 A | 12/1999 | Scholz et al. |
| 5,997,817 A | 12/1999 | Crismore et al. |
| 6,017,872 A | 1/2000 | Pedersen et al. |
| 6,040,053 A | 3/2000 | Scholz et al. |
| 6,270,637 B1 | 8/2001 | Crismore et al. |
| 6,290,685 B1 | 9/2001 | Insley et al. |
| 6,296,694 B1 | 10/2001 | Miller |
| 6,313,182 B1 | 11/2001 | Lassila et al. |
| 6,375,871 B1 | 4/2002 | Bentsen et al. |
| 6,420,622 B1 | 7/2002 | Johnston et al. |
| 6,431,695 B1 | 8/2002 | Johnston et al. |
| 6,696,286 B1 | 2/2004 | Halverson et al. |
| 6,908,453 B2 * | 6/2005 | Fleming et al. ............. 604/173 |
| 2002/0042352 A1 | 4/2002 | Yahiaoui et al. |
| 2003/0049857 A1 | 3/2003 | Chan |

FOREIGN PATENT DOCUMENTS

| | | |
|---|---|---|
| EP | 0 981 172 A1 | 2/2000 |
| EP | 1 101 803 A1 | 5/2001 |
| GB | 1 235 918 | 6/1971 |
| JP | 63-211369 | 9/1988 |
| WO | WO 01/02093 A2 | 1/2001 |
| WO | WO 01/25789 A1 | 4/2001 |
| WO | WO 02/085185 A2 | 10/2002 |

OTHER PUBLICATIONS

Brochure entitled "Dynol™ 604 Surfactant: A Fluorosurfactant Alternative" from Air Products—Pub. No. 120-9855 printed Jan. 8, 2003 (3 pgs.)

* cited by examiner

*Primary Examiner*—Randy Gulakowski
*Assistant Examiner*—Timothy J. Kugel
(74) *Attorney, Agent, or Firm*—Nancy M. Lambert

(57) ABSTRACT

Hydrophilic surfactant compositions are disclosed that include a surfactant component and a stabilizer component. The surfactant can be coated on a surface by depositing a surfactant solution on at least a portion of the surface, then drying the surfactant solution to form the dry coating. The surfactant compositions, when applied to a substrate, can provide a hydrophilic surface that retains its hydrophilic character over time, at elevated temperatures, or both.

20 Claims, No Drawings

SURFACTANT COMPOSITION HAVING STABLE HYDROPHILIC CHARACTER

BACKGROUND OF THE INVENTION

Surfactant coatings for surfaces have many utilities including fluid transport, anti-fog coatings, anti-splash coatings, wetting, foam control, and the like. Surfactants can provide a surface with desirable physical or chemical properties not provided by an underlying substrate surface.

For example, certain devices such as diagnostic test devices can be constructed with a substrate made from one or more materials that do not promote transport of fluids such as aqueous solutions to an extent sufficient to provide the device with a desired level of performance, even though the substrate materials provide other desirable qualities to the device. Thus, a surfactant coating on at least a portion of the device can provide physical or chemical properties that promote fluid transport and, therefore, improve performance of the device.

Surfactants can provide a hydrophilic surface to a substrate that promotes fluid transport over a portion of the substrate coated with the surfactant. Such hydrophilic surfaces can be provided by coatings of suitable surfactants. Suitable surfactants include, but not limited to, alkoxylated hydrocarbon alcohols; polyalkylene glycol hydrocarbon ethers and esters; silicone copolyols; polyethoxylated phenols; fatty acid esters of polyalkoxylates such as polyethyelene glycols; fluorochemical surfactants such as polyalkoxylated perfluoroalkyl-containing surfactants as well as anionic perfluoroalkyl-containing surfactants; alkyl, aralkyl and alkaryl anionic surfactants including sulfonates, sulfates, phosphonates and phosphates; and alkyl, aralkyl and alkaryl amphoteric surfactants such as betaines, sultaines, and fatty imidazolines and derivatives thereof. However, many of these surfactants may not be suitable for use in a device that experiences extended storage periods, especially at elevated temperatures and/or in a product construction where reagents, adhesives, dyes, drug and excipients, or other contaminants may exist, because the hydrophilic character provided by the surfactant coating can dissipate over time in storage or, alternatively, at elevated temperatures.

Therefore, a need exists for a surfactant composition useful for forming a coating that is able to provide a hydrophilic surface to a substrate such that the coating is able to promote fluid transport and retains its hydrophilic character to a greater extent than known surfactant coatings.

SUMMARY OF THE INVENTION

The present invention provides a surfactant composition useful for forming a coating that provides a hydrophilic surface to a substrate. The surfactant coating can promote fluid transport while retaining its hydrophilic character over time in storage, at elevated temperatures, and/or in a product construction where contaminants may exist. As used herein a "contaminant" is a component of the device which contains one or more compounds that may be volatile or migrate (even at very low levels, e.g. as low as part per million levels) and deposit on or interact with the coated surfactant composition. For example, pressure sensitive or structural adhesives are known to often contain significant levels of monomers, catalysts, plasticizers, tackifiers, and other components which over time can migrate and deposit on or interact with the surfactant composition and decrease its hydrophilic character. Other potential contaminants include reagents which may be a part of a medical device such as a diagnostic device (e.g. a strip to monitor glucose level, a urology strip, a pregnancy test device and the like), dyes that may be part of indicator or other systems, drugs and/or excipients that may be part of drug delivery devices and similar materials.

The present invention provides a surfactant composition that includes a surfactant component combined with a stabilizer component. The surfactant component is generally a liquid which, in neat form at temperatures below 45° C. and preferably at temperatures below 25° C., includes an alkoxylated alkyl diol; an alkoxylated alkyacetylenic diol; a polyalkoxylated glycerin monoester of an alkyl or aralkyl alcohol; a polyalkoxylated alkyl or aralkyl alcohol; a silicone copolyol; a polyethoxylated phenol; a fatty acid ester of a polyalkoxylated diol or triol; a fluorochemical surfactant such as a polyakoxylated perfluoroalkyl-containing surfactant or an anionic perfluoroalkyl-containing surfactant; an alkyl, aralkyl or alkaryl anionic surfactant such as sulfonate, sulfate, phosphonate or phosphate; an alkyl, aralkyl or alkaryl amphoteric surfactant such as a betaine, sultaine, or fatty imidazolines and derivatives thereof; or any combination of two or more of the foregoing. As used herein, the term "alkoxylated" means that the surfactant or stabilizer has been reacted with an alkylene oxide such that one or more units of alkylene oxide have been covalently bonded to the surfactant or stabilizer.

The stabilizer component includes an alkyl, aralkyl, or alkaryl sulfonate, sulfate, phosphonate or phosphate surfactant having from about 8 to about 24 carbon atoms that does not prohibit the surfactant composition from providing a hydrophilic surface and, free of any solvent, has a melting point greater than about 25° C. Preferred stabilizers have alkyl, arlkyl or alkaryl chains of 10 to 18 carbon atoms. The most preferred stabilizers have alkyl, arlkyl or alkaryl chains of 10 to 14 carbon atoms, e.g. 12 carbon atoms. In some cases, the stabilizer component may have a melting point greater than about 45° C. when free of any solvent. The alkyl groups may be linear, branched, cyclic or any combination thereof.

In one aspect, the present invention relates to a surfactant solution or emulsion in which the surfactant component and the stabilizer component are at least partially dissolved in a solvent or dispersed in a vehicle. In one embodiment, the surfactant solution includes from about 0.05% to about 0.5%, by weight, sodium, potassium or lithium salt of a branched chain dodecylbenzene sulfonate and from about 0.10% to about 0.6%, by weight, ethoxylated acetylenic diol, in a solvent including a mixture of isopropyl alcohol and water. The solvent may be an aqueous or organic solvent such as a hydroalcoholic solvent. Therefore, once dried the coating free of volatile solvent comprises the surfactant and stabilizer in a ratio of 0.2 to 12 wt/wt.

In another aspect, the present invention relates to a surfactant coating that results from applying the surfactant solution to a substrate surface, then drying the substrate, thereby providing a dry coating that includes the surfactant component and the stabilizer component wherein the contact angle does not exceed 25 degrees after aging for thirteen weeks at 25° C.

In another aspect, the present invention provides a method of making a hydrophilic surface on a substrate, comprising the steps of combining a surfactant component from about 0.2% to 0.6%, a stabilizer component from about 0.05% to 0.5%; and a solvent to form a surfactant composition, applying the surfactant composition to a substrate, and drying the surfactant composition on the substrate. Once dried, the surfactant composition free of the solvent when dried and coated on the substrate comprises the surfactant component and stabilizer component in a ratio of 0.2:1 to 12:1 wt/wt.

In another aspect, the surfactant composition can be used as a coating in a medical diagnostic test device with a substrate having at least one side at least partially coated with a hydrophilic coating comprising a surfactant component from about 0.2% to 0.6%, a stabilizer component from about 0.05% to 0.5% and a solvent, wherein the surfactant composition free of the solvent when dried and coated on a substrate comprises the surfactant and stabilizer in a ratio of 0.2:1 to 12:1 wt/wt; and wherein the hydrophilic characteristics indicated by a Spreading Drop Test retain at least 85% of the original spreading drop diameter after 3 weeks of aging at 23° C. and 50% relative humidity. The coating can be used to contact or transport body fluids, such as human blood, human blood components, urine, mucus, and the like.

Various other features and advantages of the present invention should become readily apparent with reference to the following detailed description. In several places throughout the specification, guidance is provided through lists of examples. In each instance, the recited list serves only as a representative group and should not be interpreted as an exclusive list.

DETAILED DESCRIPTION OF THE INVENTION

Many surfactants are capable of providing a relatively hydrophilic surface to a substrate when a coating that includes the surfactant is applied to the substrate. The hydrophilic character of the coated substrate can be evaluated by measuring, for example, the wettability of the coated substrate, the contact angle of water applied to the coated substrate, or the time required for a liquid to traverse a known distance on the coated substrate, e.g., wicking rate or fill time. However, surfaces coated with surfactants can lose at least a portion of their hydrophilic properties over time in storage or at elevated temperatures and/or in a product construction where contaminants may exist as characterized by decreased wettability, increased contact angle, longer times to traverse a distance, longer times to fill a reservoir, and the like, thereby affecting the performance of the substrate. If the hydrophilic characteristics of the substrate are important for the performance of a device, the performance of the device also may be compromised. In some cases, the loss of hydrophilic character can be pronounced in as little as twenty-four hours.

The present invention provides a surfactant composition suitable for use as a coating on a substrate that provides the substrate with hydrophilic character that can remain substantially stable for an extended period, even at elevated temperatures, e.g., temperatures greater than about 45° C. Additionally, the surfactant composition of the present invention may provide additional features advantageous for certain hydrophilic surfactant coatings.

The surfactant composition of the present invention is described below, at times, in the context of providing a hydrophilic coating to a portion of a microfluidic device. The device may be, for example, any device that is designed to transport at least a portion of a liquid sample from one portion of the device to another portion of the device. Such a device may include one or more substrates that may be substantially flat or, alternatively, may include structures such as channels. Such channels may include microstructures. As used herein "microstructure" refers to structures having the smallest cross-sectional dimensions generally from 1 um to 1000 um and typically from 10-500 um. For example, a channel may be 100 um deep but can be 10 mm wide by 20 mm long and still be a "microstructure". As used herein "microfluidic" devices are those that incorporate microstructures at least one of which is intended to transport fluid. A representative device may be, for example, a diagnostic or detection device designed to detect or identify one or more components of a liquid sample. However, the features of the present invention are equally applicable to any article or device that includes one or more substrates or surfaces that include a hydrophilic coating.

In one embodiment, the present invention includes a surfactant composition in solution. Generally, the surfactant composition includes a surfactant component and a stabilizer component. The stabilizer component may, itself, include a surfactant.

The surfactant component of the surfactant composition may include one or more surfactants that provide hydrophilic character to the composition and, therefore, also to a coating that can result from drying the surfactant composition that has been applied to at least a portion of a substrate. As used herein, the term surfactant refers to any amphipathic molecule that, when added to water, reduces surface tension. Preferred surfactants have molecular weights of less than about 2000 daltons, preferably less than about 1000 daltons, and most preferably less than about 500 daltons. The surfactant component in neat form is a liquid at temperatures below 45° C. and preferably at temperatures below 25° C. Suitable surfactants for use in the surfactant composition include, but are not limited to, nonionic surfactants such as alkoxylated hydrocarbon alcohols; polyalkylene glycol hydrocarbon ethers and esters; silicone copolyols; polyethoxylated phenols; fatty acid esters of polyalkoxylates such as polyethyelene glycols; alkoxylated alkylacetylenic diols such as those described in U.S. Pat. No. 6,313,182, issued Nov. 6, 2001; and fluorochemical surfactants such as polyakoxylated perfluoroalkyl-containing surfactants. Suitable surfactants also include, but are not limited to, anionic surfactants such as anionic perfluoroalkyl-containing surfactants; alkyl, aralkyl and alkaryl anionic surfactants including sulfonates, sulfates, phosphonates and phosphates; and alkyl, aralkyl and alkaryl amphoteric surfactants such as betaines, sultaines, and fatty imidazolines and derivatives thereof, and the like. Other surfactants suitable in the present invention include the anti-fog surfactants described in U.S. Pat. No. 6,040,053, issued Mar. 21, 2000; U.S. Pat. No. 5,997,621, issued Dec. 9, 1999; U.S. Pat. No. 5,873,931, issued Feb. 23, 1999; U.S. Pat. No. 5,753,373, issued May 19, 1998; or U.S. Pat. No. 5,723,175, issued Mar. 3, 1998.

The stabilizer component of the surfactant composition includes one or more compounds that extend the time period during which the surfactant component imparts hydrophilic character to a substrate that has been coated with the surfactant composition. The stabilizer component may be selected so that is does not substantially counteract the hydrophilic character of the surfactant component and, in fact, may be selected so that it contributes to the hydrophilic character of the surfactant composition.

In most embodiments, the stabilizer component of the surfactant compositions may have a melting point greater than about 23° C. In certain embodiments, the stabilizer component may have a melting point greater than 35° C., and preferably at least 45° C. In some embodiments, the stabilizer component may contribute to the hydrophilic character of the surfactant composition.

In some embodiments, the stabilizer component includes an anionic surfactant. In many embodiments, the stabilizer component includes an alkali metal salt of an alkyl, alkyl, alkaryl, or aralkyl sulfate or sulfonate having 8-24 carbon atoms such as an alkali metal salt of dodecylbenzene sulfonate, e.g., sodium, potassium or lithium salt of dodecylbenzene sulfonate. One preferred embodiment includes sodium dodecylbenzene sulfonate. Alkoxylated derivatives of alkyl, aralkyl, or alkaryl sulfonate, sulfate, phosphonate or phosphate surfactants are also useful as the stabilizer component. Preferred stabilizer components have less than 20, and more preferably less than 10 moles of ethoxylation per mole of alkyl, alkaryl or aralkyl group. Examples include sodium laureth-2-sulfate, sodium lauryl phosphate, sodium laureth-4-phosphate, dilaureth-4-phosphate, sodium oleyl phosphate, sodium laureth-4-sulfosuccinate and the like. Additional compounds that may be suitable for use as the stabilizer component are described in U.S. Pat. No. 5,873,931, issued Feb. 23, 1999.

The surfactant composition may be in solution or emulsion or provided as a dry coating on a substrate. When in solution or emulsion, the surfactant composition can be dissolved in any suitable solvent. Suitable solvents include water and organic solvents such as, but not limited to, ketones, ethers, and alcohols. Suitable alcohols include methanol, ethanol, 1-propanol, 2-propanol, and butanol. In certain embodiments, a suitable solvent may include a hydroalcoholic solvent such as a 70/30 mix of isopropyl alcohol and water. The surfactant composition also may be provided as a dispersion or emulsion in a suitable vehicle. For certain applications, the vehicle may contain water in order to provide a more uniform coating.

In one embodiment of the present invention, the surfactant composition includes a solution of from about 0.05% to about 0.5% stabilizer component and from about 0.1% to about 0.6% surfactant component. Therefore, when applied to a substrate and dried the composition comprises a surfactant and stabilizer in a ratio of surfactant to stabilizer of 0.2:1 to 12:1 wt/wt. Once dried, the concentration of the surfactant component is 25-95% by weight on a solvent-free basis in the dried coating, and the stabilizer component is 5-75% by weight on a solvent-free basis in the dried coating. In many embodiments, the concentration of the surfactant component is 40-80% by weight on a solvent-free basis in the dried coating, and the stabilizer component is 20-60% by weight on a solvent-free basis in the dried coating. As used herein, "solvent-free basis" means the dried coating free of any solvent, excluding water or other volatile absorbed by the coating on exposure to air or external conditions.

As indicated above, certain embodiments may include sodium dodecylbenzene sulfonate as the stabilizer component. Also, as indicated above, certain embodiments may include one or more of a wide variety of surfactants in the surfactant component. The surfactant component in particular embodiments in neat form at temperatures below 45° C. and preferably at temperatures below 25° C., is a liquid and includes one or more ethoxylated diols, polyethoxylated phenols or aralkyl sulfonates in the surfactant composition. In one embodiment, the surfactant component includes an ethoxylated acetylenic diol. The ethoxylated diol contains one or more moles of ethylene oxide per mole of acetylenic diol, and preferably 4 or more moles of ethylene oxide per mole of acetylenic diol.

In another aspect, the present invention provides a surfactant composition that dries to form a dry surfactant coating that imparts hydrophilic character to a surface or substrate coated with the surfactant composition. The surfactant composition may be deposited on any surface for which the features of the surfactant composition of the present invention may be desirable. For example, the surfactant composition may be deposited on at least a portion of a surface designed to regulate movement of a liquid sample. Examples of such devices include, but are not limited to, devices useful for performing diagnostic or detection tests on a liquid sample. It may be desirable for such devices to have a surface that is hydrophilic to promote transport of at least a portion of a liquid sample from one location on the device to another location. However, the surface of the device over or through which the sample must travel ordinarily may not be sufficiently hydrophilic to provide adequate performance of the device. In such a case, the surfactant compositions of the present invention may be deposited on at least a portion of the fluid transport surface in order to promote fluid transport of the liquid sample sufficient to provide adequate performance of the device. It could also be deposited in various patterns to control fluid flow in specific manner such as continuous, discontinuous, or repeating patterns.

The surfactant composition, in the solution form described above, may be deposited on at least a portion of the surface for which the surfactant coating is desired. The surfactant solution may be deposited by any suitable method known in the art. Such methods include, but are not limited to, spray coating, roller coating, gravure coating, wire-bar coating, dip or immersion coating, extrusion (die) coating, air knife coating, slide coating, blade coating, electrostatic coating, ink jet printing, or flow coating.

The surfactant composition may also be incorporated into a substrate allowing a portion of the composition to bloom to the surface. This can be done in cast and cure systems such as acrylic substrates where the surfactant and stabilizer components are added to the uncured or partially cured monomers and the substrate is finally cured. Alternatively, the surfactant composition can be added to a thermoplastic during the extrusion or injection molding process.

The surfactant solution may be dried, thereby forming a substantially dry hydrophilic surfactant coating by any suitable means. As used herein the terms "dried" or "drying" refer to the process of removing the solvent in which the surfactant composition is dissolved or emulsified which may or may not include water. For example, the surfactant solution can be dried by heating the coated substrate in a recirculating hot air oven, an infrared oven, or a radio frequency oven. Alternatively, the solution can be dried without heat by simple evaporation or forced air evaporation. The temperature and duration of the heating can be determined, in part, by the physical and chemical composition of the substrate, i.e., some substrate materials may be able to withstand higher temperatures without alteration of certain physical or chemical properties that may be desired for the substrate after the coating process is complete. Other substrates may have embossed or other microreplicated structures that may require higher or lower thermal profiles to dry the coating uniformly.

The substrate may be constructed of any material that can be coated and, in practice, may be dictated, at least in part, by the physical and structural requirements of the intended application. Suitable substrates include, but are not limited to, glass, metal, and polymeric substrates of various construction and composition, including plates, mesh films, nonwovens, tubes, capillaries, flat or structured films, and film/film or film/non-woven laminates. In most embodiments, the substrates are non-porous. Most preferred substrates are films which may or may not comprise three dimensional structures such as channels, pyramids, pockets and the like. Examples of suitable polymeric compositions and configurations of substrates that can be coated by the surfactant compositions of the present invention are described, for example, in U.S. Pat. No. 5,514,120, issued May 7, 1996; U.S. Pat. No. 5,728,446, issued Mar. 17, 1998; U.S. Pat. No. 6,290,685, issued Sep. 18, 2001; U.S. Pat. No. 6,375,871, issued Apr. 23, 2002; U.S. Pat. No. 6,420,622, issued Jul. 16, 2002; and U.S. Ser. No. 09/612,418, filed Jul. 7, 2000. Substrate configurations reported therein may be suitable regardless of the specific materials used to construct the substrate. Polymeric substrates may be formed by any suitable means including extrusion, injection molding, blow molding, compression molding, casting, and the like.

The substrate may determine, in part, solvents that are deemed suitable for use in depositing the surfactant composition onto at least a portion of the substrate. Certain plastic substrates can craze crack, weaken or dissolve if contacted with incompatible solvents. For example, polycarbonate substrates can be affected, sometimes severely, by exposure to ketone solvents such as acetone. However, such substrates can be coated with surfactant compositions dissolved in alcohol-based solvents without detrimental effects.

The dry surfactant coating may be of any thickness desired for a particular purpose. For example, the dry surfactant coating can be from about 10 nm to about 2000 nm thick. In some embodiments, the dry coating can be from about 60 nm to about 300 nm thick. The thickness of the coating may be selected based on the nature of the substrate and may depend, in part, on any requirements for coating uniformity. For substrates that contain microfine features, thinner coatings ranging from about 10 nm to about 1000 nm may be suitable to reduce the likelihood and extent of filling in such microfine features. In certain embodiments, coatings ranging from about 50 nm to about 500 nm may be used in connection with substrates having microfine structures.

The coating solution generally includes less than about 5% by weight stabilizer component and less than about 5% by weight surfactant component. It may become difficult to obtain a uniform coating if the concentration of one or both components is too high. In order to provide a uniform coating, the stabilizer concentration can be less than about 2%, by weight, of the total surfactant composition. Certain surfactant compositions of the present invention include less than 1%, by weight, stabilizer component, e.g., about 0.05% to about 0.5%.

The surfactant component also may be kept at relatively low concentration in order to provide a uniform coating. The surfactant component concentration may be less than about 2% by weight of the total surfactant composition. Certain surfactant compositions may include less than about 1% by weight surfactant component, e.g., from about 0.1% to about 0.6%.

As described above, the surfactant compositions of the present invention provide a hydrophilic coating to the surface or substrate to which it has been applied. Such hydrophilic character may provide the coated surface with certain functional capabilities that may be desirable for a particular application. For example, if the surfactant coating is applied to the surface of a fluid transport control film of a diagnostic device, the surfactant coating may improve the rate or extent to which the fluid control film is able to receive a liquid sample. The surfactant coating also can improve the speed, uniformity and consistency of the flow of the liquid sample from a fluid receiving portion of the fluid control film to a diagnostic or analytical portion of the fluid control film. The surfactant compositions of the present invention also can provide a hydrophilic coating that retains its hydrophilic character and at the same time provides a surface that allows for good adhesion to wide range of adhesives, including pressure sensitive adhesives such as acrylic and block copolymer adhesives such as KRATON based adhesives. A simple check for good adhesion is performed by adhering double-sided tape (Product no. 315, available from 3M, St. Paul, Minn.) to the film, adhering this to a second substrate such as glass, aging at 23 C and 50% relative humidity for 7 days and checking for adhesion. The preferred samples of the present invention remain adhered for longer than 21 weeks.

The surfactant compositions of the present invention also can provide a hydrophilic coating that retains its hydrophilic character longer than alternative hydrophilic coatings, even at elevated temperatures. Thus, a surface coated with the disclosed surfactant composition may provide the benefits associated with the hydrophilic coating for a longer period of time and/or at a higher temperature than a similar surface coated with an alternative hydrophilic coating. A device that includes a surface coated with the surfactant composition may therefore have a longer useful life than a similar device that includes a surface coated with an alternative hydrophilic coating, thereby providing a device that may be more likely to be used before its useful life is exhausted, and reducing waste generated by the discarding of expired devices.

For example, a substrate coated with a non-stabilized hydrophilic surfactant composition can lose a substantial portion of its hydrophilic character if stored, for example, for 30 days at 45° C. and a relative humidity of 50% in an indoor environment. One measure of hydrophilicity is the time required for a portion of a liquid sample to move from one point on the coated surface to another point on the coated surface, defined interchangeably as wicking rate or fill time. Shorter liquid transport times correlate with greater hydrophilic character of the surface. Non-stabilized hydrophilic surfactants may experience a significant decrease in fill time, i.e., greater than 15%, after being stored, for example, for three weeks at 40° C. In contrast, a substrate coated with a stabilized surfactant composition according to the present invention can experience decrease in fill time, i.e., less than 85%, after storage for a similar period under similar conditions.

Another measure of hydrophilicity is the contact angle measurements of a surface over time which can be used to monitor the changes in surface wetting characteristics of coated substrates. Lower contact angle values correlate with greater hydrophilic character of the surface. Non-stabilized hydrophilic surfactants may experience a significant change in contact angle after being stored, for example, for thirteen weeks at 25° C. In contrast, a substrate coated with a stabilized surfactant composition according to the present invention can experience little or no change in contact angle value after storage for a similar period under similar conditions.

The surfactant compositions of the present invention also can provide coatings that are compatible with a wide variety of applications. For example, many of the surfactant compositions of the present inventions may be useful for coating fluid control surfaces of diagnostic or detection devices because they may be non-reactive with reagents or sample components involved in the diagnostic or detection analysis. Thus, hydrophilic coatings of surfactant compositions of the present invention may be selected so that they do not interfere with the chemical or physical environmental requirements of the diagnostic or detection assay. Non-ionic surfactants and anionic stabilizers of the present invention are particular compatible with reagents in test strips such as glucose test strips, such as those disclosed in U.S. Pat. No. 6,270,637.

Certain surfactant compositions of the present invention can provide hydrophilic coatings that retain a certain level of clarity over the storage period. Thus, when used in devices in which clarity of the hydrophilic coating is desired, such surfactant compositions can have particular utility. This is particularly important when coated on transparent substrates such as polyethylene terephthalate, polycarbonate, acrylics and the like.

Accordingly, certain embodiments of the present invention may be particularly useful for providing hydrophilic coatings on fluid transport surfaces of, for example, a diagnostic device, because the disclosed surfactant compositions provide a coating that is 1) hydrophilic so that the coating promotes efficient transport of at least a portion of a liquid sample from a sample receiving portion of the device to an analytical portion of the device; 2) stable so that the hydrophilic character and, in some cases, the clarity of the surface is maintained, thereby increasing the likelihood that the device will be used before its useful life is exhausted; 3) non-reactive with both the reagents and the sample components involved in the diagnostic assay; and 4) provides a surface that has good adhesion properties to a variety of conventional adhesives used for such devices. Each of these features of the surfactant composition contribute to improving the performance of a device that includes a surface coated with a surfactant composition according to the present invention.

The invention is further illustrated by the following examples, which are not intended to limit the scope of the invention. In the examples, parts, ratios and percentages are by weight unless otherwise indicated.

EXAMPLES

Glossary

| Acronym | Trade Name | Chemical Description | Source/Address |
|---|---|---|---|
| Reagent 1 | | | Roche Diagnostics/ Indianapolis, IN |
| Reagent 2 | | | Roche Diagnostics |
| | DYNOL 604 | ethoxylated acetylenic diol | Air Products and Chemicals, Inc., Allentown, PA. |
| | SURYNOL 465 | ethoxylated acetylenic diols | Air Products and Chemicals, Inc. |
| | TAGAT L2 | Polyoxyethylene glycerol monolaurate | Degussa-Goldschmidt/ Hopewell, VA |
| | LAMBENT 703 | silicone copolyol | Lambent Technologies/ Fernandina Beach, FL |
| | ZONYL FSN | Fluorochemical surfactants - nonionic (40% solids) | E.I. Du Pont De Nemours & Co./ Wilmington, DE |
| | POLYSTEP A16 | Sodium branched alkyl benzene sulfonate | Stepan Company/ Northfield, IL |
| | AEROSOL OT | Dioctyl ester of sodium sulfosuccinic acid | Cytec Industries/ West Patterson, NJ |

-continued

| Acronym | Trade Name | Chemical Description | Source/Address |
|---|---|---|---|
| FC95 | FLUORAD 95 | Potassium perfluoroalkyl sulfonates - anionic (100%) | 3 M Company/St. Paul, MN |

Examples 1-2

A coating solution was prepared by adding a surfactant component and a stabilizer component in the amounts shown in Table 1a to a 70/30 weight percent isopropyl alcohol (IPA)/water solvent.

TABLE 1a

Composition of Coating Solutions

| Coating Composition No. | Solvent IPA/Water 70/30 (wt. %) | Surfactant DYNOL 604 (weight percent) | Stabilizer RHODACAL DS10 (weight percent) |
|---|---|---|---|
| 1 | 99.2 | 0.6 | 0.2 |

Preparation of Coated Substrate: Composition 1 was coated onto a polyester plastic film (commercially available as MELINEX 454 from E.I. duPont de Nemours and Company, Wilmington, Del.) using the reverse Gravure roll method with knurled roll (Tool reference #34, cell count of 150, Parmarco Inc., Batavia, Ill.) with a pitch of 150 (volume factor of 0.89). The roll to line speed ratio was maintained at 2:1 or 1.5:1. After coating, the solution was dried in an oven (10 foot Air Flow oven, part of Hirano Coater, Hirano Co., Japan) at 75° C. The uniformity of the coating was checked visually when the coating was still wet and then by applying a drop of water every ½ inch to 1 inch across the web and noticing the diameter and wicking characteristics of the drop. The thickness of the dry coating was determined using a Scanning Electron Microscopy (Hitachi model S-4500 field emission SEM (FESEM)). The thickness of the dry coating varied from 60 nm to 200 nm.

Examples 1 and 2 were prepared by combining the coated substrate with the chemistry of Reagent 1 and Reagent 2 respectively, such as those reagents-disclosed in U.S. Pat. No. 6,270,637. The coated substrate was the foil used to make the "capillary roof" of prototype Blood glucose (bG) test strips that function in a manner similar to those described in U.S. Pat. No. 6,270,637 for Examples 1-2.

Fill Time Test: Roche Diagnostics Corp. (Indianapolis, Ind.) tested the test strips using the following procedure: One tube of whole blood was drawn the day of testing using lithium heparin as an anticoagulant and a hematocrit corresponding to 42%±2%.

Several electronic components was used to record and time the image of blood sample as it filled the capillary chamber of the sensor: Casablanca video editing system with a removable hard drive, Sony TRINITRON monitor, HORITA time stamp generator, PANASONIC Digital 5000 video Camera, MITSUBISHI VCR, and a DYNA Fiber Optic Light.

The removable hard drive was placed into the Video Editing System and the electronic components listed above were turned on. The 'display' key was pressed to start the timer. A strip from the ACCU-CHEK Advantage meter was placed under the camera. The 'edit' button was selected from the main menu on the video editing system. Next the 'record' button was selected and the image from the camera appeared. The lighting was adjusted by turning the adjustment knob on the fiber optic light source. The image of the sensor was focused using the macro ring and lens on the video camera. The time stamp was checked for format (typically SS:TH) and to determine that it was running. Using a RAININ pipette for the appropriate sample volume (2.0 μL for NWS-V type sensors, 1.0 μL for Crusader type sensors), this volume was withdrawn from the tube of mixed whole blood. The tip of the pipette was wiped using a KIMWIPE wipe and the plunger depressed to form a hanging drop. The video editing system was started by selecting the 'record' button with the left mouse button. The sensor was immediately dosed by touching the blood drop to the middle of a sensor portion of the test strip. The 'stop' button was pressed with the left mouse button. Each clip was labeled automatically by the video editing system with an ID starting with the letter S and followed by incremental numbers indicating the slide number. A log sheet was used to record sample volume, hematocrit, and sensor ID. The process was repeated until all of the sensors were filled and recorded.

After all of the sensors were recorded, the first recorded slide was selected and the 'trim' button was selected on the 'edit' screen of the video editing system. Using the roller ball, 'in' was selected; the ball was rolled to the right until the first instant that the blood sample entered the capillary chamber. The time displayed on the screen by the time stamp generator was recorded as the 'initial' time in seconds.

The ball was rolled to the right again until the blood sample reached the drop detect electrodes. This was the first moment that the blood sample bridges the vertical gap between the 2 drop detect electrodes so the blood was touching both electrodes. The time displayed on the screen was recorded as the 'sample sufficiency' time.

The 'total fill time' was calculated by subtracting the 'initial time' from the 'sample sufficiency' time.

Test strips were aged for 0 weeks ($T_0$), 3 weeks ($T_3$), 6 weeks ($T_6$), 13 weeks ($T_{13}$) and 21 weeks ($T_{21}$) at three different temperatures (4° C., 32° C., and 45° C.) in storage vials. The results of total fill time at 4° C., 32° C. and 45° C. after aging for $T_{13}$ and $T_{21}$ are shown in Table 1b.

TABLE 1b

Results of Fill Time Test at $T_{13}$, and $T_{21}$ and at 4° C., 32° C. and 45° C.

| | Total Fill Time (seconds) | | | | | |
|---|---|---|---|---|---|---|
| | At 4° C. | | At 32° C. | | At 45° C. | |
| Example No. | $T_{13}$ | $T_{21}$ | $T_{13}$ | $T_{21}$ | $T_{13}$ | $T_{21}$ |
| 1 | 0.18 | 0.20 | 0.29 | 0.29 | 0.20 | 0.22 |
| 2 | 0.31 | 0.20 | 0.16 | 0.17 | 0.50 | 0.34 |

The results indicated that a combination of the DYNOL 604 ethoxylated acetylenic diol and the RHODACAL DS10 surfactant was very stable. The fill time of Example 1 remained the same or decreased after 1 week of aging at each temperature tested.

Water Contact Angle Measurements: Water Contact Angle Measurements were used to monitor the changes in surface wetting characteristics of coated films. These films were cut into 8 by 70 mm strips, stored at 25° C., 32° C., and 45° C. for 0, 1, 3, 6, 9, 13, 21, 26, 39, 52, 78, and 104 weeks in storage vials (Glass with screw cap tops containing TEFLON-coated liners (TEFLON-coated side of liner was always oriented towards inside of jar.), 40 mL (I-Chem/VWR#IRC236-0040)), and subjected to water contact angle measurements. Water (Type I) contact angles were determined using video contact angle analyses (commercially available as First Ten Angstroms, model FTA 125 Video Contact Angle Analysis System). For each combination of storage temperature/time, three strips were measured for contact angle on the hydrophilic interface between the liner and the film.

Disposable nitrile gloves were used to handle the test strips and the surfaces were not touched prior to or during testing.

FTA analysis: The 100-μL instrument syringe was filled with Type I water. The lighting, camera focus and aperture were adjusted for the best image at the syringe needle tip. The strip was placed on the metal plate located on top of the FTA sample stage. The ends of the strip were secured with magnets with the edge of the test strip as close to the edge of the metal plate as possible. If the test strip was lying flat with no wrinkles, the FFA sample stage was oriented so that the camera optical path was perpendicular to the front edge of the test strip. The stage was moved until the syringe needle was just inside the strip edge so that there was enough room to dispense a water drop. A video movie (about 4 seconds) was collected for analysis for each contact angle. The purpose was to capture a movie that framed time zero and a progression of images until drop equilibration was established.

The test strip was lying flat without any wrinkles, and a piece of double-sided tape (Product no. 315, available from 3M, St. Paul, Minn.) was affixed along the lengthwise edge of a 25 by 75 mm glass slide. The strip to be tested was attached to the tape on the slide with the edge of the test strip as close to the edge of the slide and tape as possible. The slide with the attached test strip on the metal plate located on top of the FTA sample stage and the video movie was made as previously described.

Initial and 'at equilibrium' contact angles were recorded for each analysis area. The average of nine water contact angles were calculated and recorded in degrees for each strip. The results of Average Water Contact Angle Measurements at 25° C., 32° C. and 45° C. after 13 and 21 weeks for Examples 1 and 2 are shown in Table 1c.

TABLE 1c

Water Contact Angle Measurements of Test Strip Surface at $T_{13}$, and $T_{21}$ and at 25° C., 32° C. and 45° C.

| | Initial Contact Angle/Final Contact Angle (degrees) | | | | | |
|---|---|---|---|---|---|---|
| | At 25° C. | | At 32° C. | | At 45° C. | |
| Example No. | $T_{13}$ | $T_{21}$ | $T_{13}$ | $T_{21}$ | $T_{13}$ | $T_{21}$ |
| 1 | 19/10 | 16/10 | 14/10 | 16/10 | 16/10 | 18/10 |
| 2 | 14/10 | 14/10 | 15/10 | 15/10 | 17/10 | 14/10 |

The smaller contact angle values for Example 1 and 2 indicate that the surface is very hydrophilic through a range of temperatures, including elevated temperatures, and remains hydrophilically stable over a significant period of time, i.e., twenty-one weeks.

Example 3

The coating solution, the preparation of the coated substrate and the construction of the test strip was the same as that described for Examples 1 and 2.

The test strips were evaluated for fill time using the Fill Time Test described for Examples 1 and 2. The results of total fill time at 4° C., 32° C. and 45° C. after aging for $T_{13}$ and $T_{21}$ are shown in Table 2a.

TABLE 2a

Results of Fill Time Test at $T_0$, $T_3$, $T_6$, $T_{13}$, and $T_{21}$ and at 4° C.

| | Total Fill Time (seconds) | | | | |
|---|---|---|---|---|---|
| Example No. | $T_0$ At 25° C. | $T_3$ At 4° C. | $T_6$ At 4° C. | $T_{13}$ At 4° C. | $T_{21}$ At 4° C. |
| 3 | 0.14 ± 0.03 | 0.42 ± 0.27 | 0.27 ± 0.22 | 0.31 ± 0.25 | 0.20 ± 0.16 |

TABLE 2b

Results of Fill Time Test at $T_0$, $T_3$, $T_6$, $T_{13}$, and $T_{21}$ and at 32° C.

| | Total Fill Time (seconds) | | | | |
|---|---|---|---|---|---|
| Example No. | $T_0$ At 25° C. | $T_3$ At 32° C. | $T_6$ At 32° C. | $T_{13}$ At 32° C. | $T_{21}$ At 32° C. |
| 3 | 0.14 ± 0.03 | 0.49 ± 0.28 | 0.35 ± 0.18 | 0.16 ± 0.03 | 0.17 ± 0.08 |

TABLE 2c

Results of Fill Time Test at $T_0$, $T_3$, $T_6$, $T_{13}$, and $T_{21}$ and at 45° C.

| | Total Fill Time (seconds) | | | | |
|---|---|---|---|---|---|
| Example No. | $T_0$ At 25° C. | $T_3$ At 45° C. | $T_6$ At 45° C. | $T_{13}$ At 45° C. | $T_{21}$ At 45° C. |
| 3 | 0.14 ± 0.03 | 0.52 ± 0.14 | 0.23 ± 0.06 | 0.50 ± 0.37 | 0.34 ± 0.23 |

The fill time of Example 3 increased slightly after 3 to 6 weeks of aging at each temperature tested and decreased to nearly the same time after 13 to 21 weeks of aging.

The hydrophilic films were evaluated using the Water Contact Angle Measurements described in Examples 1 and 2. The results are shown in Table 2d, 2e, and 2f.

TABLE 2d

Water Contact Angle Measurements of Test Strip Surface at $T_0$, $T_1$, $T_3$, $T_6$, $T_9$, $T_{13}$, $T_{21}$, $T_{26}$ and at 25° C.

| Example No. | Initial Contact Angle/Final Contact Angle (degrees) At 25° C. | | | | | | | |
|---|---|---|---|---|---|---|---|---|
| | $T_0$ | $T_1$ | $T_3$ | $T_6$ | $T_9$ | $T_{13}$ | $T_{21}$ | $T_{26}$ |
| 3 | 22/<10 | 25/<10 | 20/<10 | 22/<10 | 21/<10 | 21/<10 | 22/10 | 22/<10 |

TABLE 2e

Water Contact Angle Measurements of Test Strip Surface at $T_0$, $T_1$, $T_3$, $T_6$, $T_9$, $T_{13}$, $T_{21}$, $T_{26}$ and at 32° C.

| Example No. | Initial Contact Angle/Final Contact Angle (degrees) At 32° C. | | | | | | | |
|---|---|---|---|---|---|---|---|---|
| | $T_0$ | $T_1$ | $T_3$ | $T_6$ | $T_9$ | $T_{13}$ | $T_{21}$ | $T_{26}$ |
| 3 | NA* | 23/<10 | 19/<10 | 21/<10 | 20/<10 | 20/<10 | 23/10 | 21/<10 |

*Not available

TABLE 2f

Water Contact Angle Measurements of Test Strip Surface at $T_0$, $T_1$, $T_3$, $T_6$, $T_9$, $T_{13}$, $T_{21}$, $T_{26}$ and at 45° C.

| Example No. | Initial Contact Angle/Final Contact Angle (degrees) At 45° C. | | | | | | | |
|---|---|---|---|---|---|---|---|---|
| | $T_0$ | $T_1$ | $T_3$ | $T_6$ | $T_9$ | $T_{13}$ | $T_{21}$ | $T_{26}$ |
| 3 | NA* | 23/<10 | 21/<10 | 21/<10 | 20/<10 | 19/<10 | 22/10 | 20/<10 |

*Not available

For comparison purposes, the water contact angle of the back of the test strip (without hydrophilic coating) measured 43/24 Initial/Final in degrees at $T_0$ and was 91/91 Initial/Final in degrees after 26 weeks of aging at 45° C. In contrast, the contact angle of Example 3 was initially lower than the comparison value, and remained low through 26 weeks of aging.

Examples 4-13 and Comparative Examples A-I

Coating solutions were prepared by adding the amounts of the components given in Table 3a to a 70/30 weight percent IPA/water solvent.

TABLE 3a

| Example Number | Solvent IPA/water (wt. %) | Surfactants Type | Amount (wt. %) | Stabilizers Type | Amount (wt. %) |
|---|---|---|---|---|---|
| 4 | 99.60 | DYNOL 604 | 0.30 | POLYSTEP A16 | 0.10 |
| 5 | 99.60 | SURFYNOL 465 | 0.30 | POLYSTEP A16 | 0.10 |
| 6 | 99.60 | TAGAT L2 | 0.30 | POLYSTEP A16 | 0.10 |
| 7 | 99.60 | LAMBENT 703 | 0.30 | POLYSTEP A16 | 0.10 |
| 8 | 99.15 | ZONYL FSN (40%) | 0.75 | POLYSTEP A16 | 0.10 |
| 9 | 99.60 | DYNOL 604 | 0.30 | AEROSOL OT (75%) | 0.13 |
| 10 | 99.60 | DYNOL 604 | 0.30 | FC95 | 0.10 |
| 11 | 99.57 | LAMBENT 703 | 0.30 | AEROSOL OT (75%) | 0.13 |

TABLE 3a-continued

| Example Number | Solvent IPA/water (wt. %) | Surfactants Type | Amount (wt. %) | Stabilizers Type | Amount (wt. %) |
|---|---|---|---|---|---|
| 12 | 99.60 | LAMBENT 703 | 0.30 | FC95 | 0.10 |
| 13 | 99.12 | ZONYL FSN (40%) | 0.75 | AEROSOL OT (75%) | 0.13 |
| Comparative A | 99.15 | ZONYL FSN (40%) | 0.75 | FC95 | 0.10 |
| Comparative B | 99.70 | DYNOL 604 | 0.30 | None | 0.00 |
| Comparative C | 99.70 | SURFYNOL 465 | 0.30 | None | 0.00 |
| Comparative D | 99.70 | TAGAT L2 | 0.30 | None | 0.00 |
| Comparative E | 99.70 | LAMBENT 703 | 0.30 | None | 0.00 |
| Comparative F | 99.75 | ZONYL FSN | 0.75 | None | 0.00 |
| Comparative G | 99.87 | None | 0.00 | AEROSOL OT | 0.13 |
| Comparative H | 99.90 | None | 0.00 | POLYSTEP A16 | 0.10 |
| Comparative I | 99.90 | None | 0.00 | FC95 | 0.10 |

The solutions were coated onto a polyester plastic film (0.10 mm thick biaxially oriented corona discharge treated polyethylene terephalate film) using a Meyer rod and the coating was dried at 100° C. The coated films were subjected to accelerated aging (which was used for the data in Table 2b). Coated films were cut to approximately 7.5×12 cm pieces and placed vertically in a rack and all surfaces were exposed to recirculating air in a constant temperature (25° C.) and relative humidity (50%) room. The hydrophilicity was evaluated every week to 21 days using the Spreading Drop Test.

Spreading Drop Test: Each film sample was conditioned at 23° C. and 50 percent relative humidity for a minimum of 8 hours before and during testing. Care was taken to ensure that the film samples were not contaminated and that exposure to the environment did not result in decreased wetting. The film samples were placed on a clean flat horizontal surface with the side to be tested up. At ambient conditions (approximately 23° C.) a 3 microliter drop of deionized and distilled water containing 0.07% by weight "Wool Fast Brilliant Red R.L. Dye," commercially available from Pylam, Garden City, N.Y., from an accurate syringe was gently placed on the surface by holding the syringe vertically and just touching the drop to the surface so that the drop did not fall and impact the surface. The drop was allowed to spread to its maximum extent and completely dry. The diameter of the drop was determined by placing the film over a paper with premeasured circles of varying diameters. The average drop diameter was recorded. Irregular shaped drop sizes were approximated. The percent retention of the drop size was calculated between day 7 and day 22. Table 3b shows percent retention of the drop size or the hydrophilic properties.

TABLE 3b

| Example Number | Spreading Drop Diameter (cm) | | | | Percent Retention (%) |
|---|---|---|---|---|---|
| | After 7 days | After 14 days | After 22 days | After 29 days | |
| 4 | 7.1 | 7.5 | 7.2 | 6.9 | 101.4 |
| 5 | 6.6 | 6.2 | 7.3 | 7.0 | 110.6 |
| 6 | 7.4 | 6.9 | 6.7 | 6.9 | 90.9 |
| 7 | 8.1 | 7.3 | 7.4 | 7.3 | 91.5 |
| 8 | 7.0 | 7.0 | 7.3 | 6.9 | 104.8 |
| 9 | 8.7 | 7.8 | 7.5 | 7.1 | 86.9 |
| 10 | 7.6 | 6.8 | 6.8 | 6.9 | 89.5 |
| 11 | 7.8 | 7.9 | 7.3 | 7.5 | 93.2 |
| 12 | 8.4 | 8.0 | 8.1 | 8.0 | 96.0 |
| 13 | 7.3 | 6.8 | 6.6 | 7.8 | 89.8 |

TABLE 3b-continued

| Example Number | Spreading Drop Diameter (cm) | | | | Percent Retention (%) |
|---|---|---|---|---|---|
| | After 7 days | After 14 days | After 22 days | After 29 days | |
| Comparative A | 7.2 | 6.7 | 5.9 | 7.0 | 81.9 |
| Comparative B | 12.0 | 9.0 | 9.5 | 9.2 | 79.0 |
| Comparative C | 7.6 | 6.8 | 6.1 | 6.7 | 80.3 |
| Comparative D | 6.7 | 6.3 | 5.5 | 6.3 | 82.1 |
| Comparative E | 8.0 | 6.8 | 6.8 | 7.2 | 84.9 |
| Comparative F | 6.8 | 6.2 | 5.7 | 6.4 | 83.8 |
| Comparative G | 8.1 | 7.7 | 6.6 | 7.2 | 81.6 |
| Comparative H | 8.3 | 6.9 | 6.3 | 6.9 | 76.0 |
| Comparative I | 7.1 | 5.6 | 5.6 | 6.4 | 78.9 |

The results of the spreading drop test for Examples 4-13 were greater than 87 percent retention while the results of the spreading drop test for Comparative Examples A-I were less than 85 percent retention.

Various modifications and alterations to this invention will become apparent to those skilled in the art without departing from the scope and spirit of this invention. The complete disclosures of the patents, patent documents and publications cited herein are incorporated by reference in their entirety as if each were individually incorporated. In case of conflict, the present specification, including definitions, will control.

It should be understood that this invention is not intended to be unduly limited by the illustrative embodiments set forth herein and that such illustrative embodiments are presented by way of example only with the scope of the invention intended to be limited only by the claims set forth herein as follows.

What is claimed is:

1. A hydrophilic surface coated with a surfactant composition comprising:
   a nonionic surfactant component from about 0.2% to 0.6% selected from the group consisting of alkoxylated alkyl diol; alkoxylated alkyacetylenic diol; alkoxylated glycerin monoester of an alkyl alcohol; alkoxylated glycerin monoester of an aralkyl alcohol; alkoxylated alkyl alcohol; polyalkoxylated aralkyl alcohol; silicone copolyol; polyethoxylated phenol; a fatty acid ester of a polyalkoxylated diol; a fatty acid ester of a polyalkoxylated triol, and polyalkoxylated perfluoroalkyl-containing surfactant;
   a stabilizer component from about 0.05% to 0.5%; and a solvent;

wherein the surfactant composition is dried on the surface;

wherein the surfactant composition free of the solvent when dried and coated on a substrate comprises the surfactant and stabilizer in a ratio of 0.2:1 to 12:1 wt/wt; and wherein the hydrophilic characteristics indicated by a Spreading Drop Test retain at least 85% of the original spreading drop diameter after 3 weeks of aging at 23° C. and 50% relative humidity.

2. The surfactant composition of claim 1 wherein the solvent comprises a mixture of water and alcohol.

3. The surfactant composition of claim 2 wherein the alcohol is selected from the group consisting of methanol, ethanol, 1-propanol, 2-propanol, and butanol.

4. The surfactant composition of claim 1 wherein the stabilizer component has a melting point greater than 25° C.

5. The surfactant composition of claim 4 wherein the stabilizer component has a melting point of at least 45° C.

6. The surfactant composition of claim 1 wherein the stabilizer component is selected from the group consisting of anionic perfluoroalkyl-containing surfactant; alkyl, aralkyl or alkaryl sulfonate; alkyl, aralkyl or alkaryl sulfate; alkyl, aralkyl or alkaryl phosphonate; alkyl, aralkyl or alkaryl phosphate; aralkyl or alkaryl phosphonate; alkyl, aralkyl or alkaryl betaine; aralkyl or alkaryl phosphonate sultaine; and fatty imidazolines and derivatives thereof.

7. The surfactant composition of claim 6 where the stabilizer component is an aralkyl sulfonate.

8. The surfactant composition of claim 6 where the stabilizer component is an alkali metal salt of dodecylbenzene sulfonate.

9. The surfactant composition of claim 1 wherein the surfactant component is a liquid at temperatures below 25° C.

10. The surfactant composition of claim 1 wherein the surfactant component is an ethoxylated acetylenic diol.

11. The surfactant composition of claim 1 wherein the hydrophilic characteristics indicated by the spreading drop diameter retain at least 90% of the original drop diameter after 3 weeks of aging at 23° C. and 50% relative humidity.

12. The surfactant composition of claim 1 wherein the hydrophilic characteristics indicated by the spreading drop diameter retain at least 95% of the original drop diameter after 3 weeks of aging at 23° C. and 50% relative humidity.

13. A coated article, comprising a non-porous substrate; and a dried coating comprising a surfactant component and a stabilizer component in a ratio of 0.2:1 to 12:1 wt/wt wherein the hydrophilic characteristics indicated by the spreading drop diameter retain at least 85% of the original drop diameter after 3 weeks of aging at 23° C. and 50% relative humidity;

wherein the surfactant component is a nonionic surfacrant selected from the group consisting of alkoxylated alkyl diol; alkoxylated alkyacetylenic diol; alkoxylated glycerin monoester of an alkyl alcohol; alkoxylated glycerin monoester of an aralkyl alcohol; alkoxylated alkyl alcohol; polyalkoxylated aralkyl alcohol; silicone copolyol; polyethoxylated phenol; a fatty acid ester of a polyalkoxylated diol; a fatty acid ester of a polyalkoxylated triol, and polyalkoxylated perfluoroalkyl-containing surfactant.

14. The coating of claim 13 wherein the stabilizer component is a selected from the group consisting of anionic perfluoroalkyl-containing surfactant; alkyl, aralkyl or alkaryl sulfonate; alkyl, aralkyl or alkaryl sulfate; alkyl, aralkyl or alkaryl phosphonate; alkyl, aralkyl or alkaryl phosphate; alkyl, aralkyl or alkaryl betaine; alkyl, aralkyl or alkaryl sultaine; and fatty imidazolines and derivatives thereof.

15. The coating of claim 14 wherein the stabilizer component is an alkali metal salt of dodecylbenzene sulfonate.

16. The coating of claim 13 wherein the surfactant component is a liquid at temperatures below 25° C.

17. The coating of claim 13 wherein the surfactant component is an ethoxylated acetylenic diol.

18. The coating of claim 13 wherein the stabilizer component has a melting point greater than 25° C.

19. The coating of claim 13 wherein the hydrophilic characteristics indicated by the spreading drop diameter retain at least 90% of the original drop diameter after 3 weeks of aging at 23° C. and 50% relative humidity in a recirculated chamber.

20. The coating of claim 13 wherein the substrate is a film.

* * * * *

UNITED STATES PATENT AND TRADEMARK OFFICE
CERTIFICATE OF CORRECTION

PATENT NO. : 7,378,451 B2  
APPLICATION NO. : 10/687340  
DATED : May 27, 2008  
INVENTOR(S) : Yolla B. Levitt Page 1 of 1

It is certified that error appears in the above-identified patent and that said Letters Patent is hereby corrected as shown below:

Column 1  
Lines 28-29, delete "polyethyelene" and insert -- polyethylene --, therefor.

Column 2  
Line 16, delete "polyakoxylated" and insert -- polyalkoxylated --, therefor.

Column 4  
Line 34, delete "polyethyelene" and insert -- polyethylene --, therefor.  
Line 37, delete "polyakoxylated" and insert -- polyalkoxylated --, therefor.

Column 11  
Line 3, delete "Next" and insert -- Next, --, therefor.

Column 12  
Line 24, delete "FFA" and insert -- FTA --, therefor.

Column 15  
Line 22, delete "terephalate" and insert -- terephthalate --, therefor.

Column 17  
Line 28, in Claim 7, delete "where" and insert -- wherein --, therefor.

Column 18  
Line 10, in Claim 13, delete "surfacrant" and insert -- surfactant --, therefor.  
Line 22, in Claim 14, after "is" delete "a".

Signed and Sealed this

Fifth Day of August, 2008

JON W. DUDAS  
*Director of the United States Patent and Trademark Office*